United States Patent Office 3,425,933
Patented Feb. 4, 1969

3,425,933
HALOGEN HYDRIDE RECOVERY IN A HYDROREFINING PROCESS
George R. Lester, Park Ridge, Ill., assignor to Universal Oil Products Company, Des Plaines, Ill., a corporation of Delaware
No Drawing. Filed Feb. 6, 1967, Ser. No. 614,016
U.S. Cl. 208—209                        5 Claims
Int. Cl. C10g 29/12, 13/08

ABSTRACT OF THE DISCLOSURE

An ammonium halide-containing, residual metallic sludge is heated to vaporize the ammonium halide. The vapors are contacted with an oxygen-containing boron compound at conditions selected to form ammonium borate and a halogen hydride. Suitable boron compounds are the oxyacids and the anhydrides thereof.

APPLICABILITY OF INVENTION

The present invention constitutes an improvement in hydrocarbon conversion processes intended to effect the hydrorefining/hydrocracking of heavy hydrocarbonaceous charge stocks, and is especially adaptable for integration into a process for converting black oils. More specifically, my invention encompasses a scheme for recovering halogen in a conversion process which utilizes a halogen hydride as the catalytic agent.

Black oils, particularly atmospheric and vacuum residuum, contain high molecular weight sulfurous compounds, large quantities of nitrogenous compound, high molecular weight organometallic complexes, principally comprising nickel and vanadium, and a considerable quantity of asphaltic material insoluble in lower boiling hydrocarbons such as pentane and/or heptane. An abundant supply of such hydrocarbonaceous material exists, most of which has a gravity °API at 60° F., less than 20.0, and a significant proportion of which has a gravity less than 10.0. Black oils are further characterized in that the boiling range thereof indicates that 10.0% by volume, or more boils above a temperature of 1050° F. Specific examples of the black oils, a process for the conversion of which advantageously utilizes the present invention, include a vacuum tower bottoms product having a gravity of 7.0 °API at 60° F., and containing 4.1% by weight of sulfur and 23.7% by weight of asphaltics; a Middle East crude oil having a gravity of 11.0 °API at 60° F., containing 10.1% by weight of asphaltics and about 5.2% by weight of sulfur; and a vacuum residuum having a gravity of 8.8 °API at 60° F., and containing 3.0% by weight of sulfur and 4300 p.p.m. of nitrogen, and having a 20.0% volumetric distillation temperature of 1055° F. Processes which are intended for the conversion of black oils utilize hydrocracking/hydrorefining techniques for the principal purposes of (1) reducing the concentration of various contaminating influences, and (2) to convert the heavy hydrocarbonaceous material into lower boiling hydrocarbon products significantly reduced in the concentration of the foregoing contaminants.

In view of the physical and chemical characteristics of black oils, conversion processes employing a fixed bed of a catalytic composite have been considered nonfeasible on an economic basis due to the deposition of large quantities of unreacted asphaltics onto and throughout the catalyst and processing equipment. Thus, many conversion processes operate with a nonsolid catalytic agent including the halogen hydrides, hydrogen chloride, hydrogen iodide and hydrogen bromide, although so-called "HF-cracking" has been described in the literature, as has sulfuric acid.

The present invention constitutes an improvement in those conversion processes which employ nonsolid catalytic agents, and particularly the halogen hydrides where the halogen is selected from the group consisting of chlorine, iodine, bromine and mixtures thereof. In a broad embodiment, therefore, the present invention affords an improvement in a process for hydrorefining black oils containing sulfurous and nitrogenous compounds, and metallic contaminants, in which process a halogen hydrides of a halogen selected from the group consisting of iodine, chlorine, bromine and mixtures thereof is employed as the catalytic agent in admixture with said black oil, which halogen hydride forms ammonium halide which is contained within a separated residual metallic sludge, which improvement comprises heating said sludge to a temperature above the sublimation temperature of said ammonium halides, passing the resulting vapors into a conversion zone containing an oxygen-containing boron compound and reacting said ammonium halides to form ammonium borate and halogen hydrides, and recycling said halogen hydrides to said hydrorefining process.

An object of the present invention is, therefore, to provide a relatively simple and economical method for the recovery of halogen and halogen hydride in a halogen hydride hydrocarbon conversion process.

A corollary objective is to recover halogen and halogen hydride from a mixture of ammonium halide with an asphaltic, metal-containing sludge.

Another object is to provide an improvement in a process for hydrorefining/hydrocracking of hydrocarbonaceous material commonly referred to in the art as "black oil."

Other embodiments of my invention are concerned with operating conditions and specific reagents and reactants. The ammonium halide-containing sludge is heated to a temperature at which the halide is volatile; for ammonium chloride, the temperature of sublimation is about 640° F.; for the iodide, it is 761° F.; and, for the bromide, the sublimation temperature is about 1008° F. It is also of importance to maintain the temperature, at which the oxygen-containing boron compound is contacted, at a level below about 400° F., since ammonium borate decomposes at higher levels to form ammonia. The halogen hydrides are those selected from the group wherein the halogen has an atomic number from 17 to 53, according to the Periodic Chart of The Elements, Fisher Scientific Company, 1953. Suitable oxygen-containing compounds of boron include the oxyacids and hydrides thereof. Thus, the boron compounds for use herein are exemplified by orthoboric acid (or boracic acid), tetraboric acid (or pyroboric acid) and boric anhydride ($B_2O_3$) etc.

PRIOR ART

While it is recognized that the prior art abounds with disclosures of the use of halogen hydrides in various heavy hydrocarbon conversion processes, I believe that there is no recognition therein of the improvement to be attained through the use of my invention. Exemplary of the prior art, and illustrative of the processes to which the instant improvement might be adapted, include U.S. Patent No. 3,044,956 (Cl. 208–252) which teaches a scheme for treating petroleum residuals to remove metallic contaminants. The catalytic agent is anhydrous hydrogen iodide and/or hydrogen bromide in admixture with a hydroaromatic material. It is important to note that there is no appreciation of the fact that the halogen hydride will react with the ammonia, thereby forming an ammonium halide and effectively removing the hydride from further catalytic action.

U.S. Patent No. 2,744,853 (Cl. 208–251) discusses the conversion of oil-soluble metal compounds, utilizing elemental iodine, into oil-insoluble, metal-containing compounds which are substantially separated from the treated product in the form of an insoluble sludge. Significantly, the present invention is not principally concerned with creating an insoluble metal-containing sludge, but rather with recovering the catalytic agent in its catalytically active hydride form from the insoluble sludge, as distinguished from losing the agent as an insoluble halide.

The use of iodine and/or hydroiodic acid to form insoluble iodides of nickel, vanadium, iron and copper (acknowledged as the predominant contaminating metals existing as complexes), is disclosed in U.S. Patent No. 2,729,593 (Cl. 208–251). The insoluble iodides are removed by commonly employed separation means including filtration, settling, centrifuging, etc. It is preferred, in accordance with the disclosed process, to effect demetallization without effecting a substantial degree of conversion to lower boiling products. Since conversion reactions are not effected, ammonia is not formed as a result of the destruction of nitrogenous compounds, and no ammonia iodide is formed.

Of interest also is U.S. Patent No. 2,222,596 (Cl. 208–252) which offers an oil treatment process using the oxyacids of boron, and the anhydrides thereof, for the purpose of reducing the metal content of the oil by way of the formation of insoluble metal borates.

Although U.S. Patent No. 2,971,905 (Cl. 208–252) discloses the treatment of heavy hydrocarbon mixtures with hydrogen halides, and specifically with hydrogen chloride, the process is mainly concerned with employing the halide for the purpose of coagulating the unconverted nonvolatile metallic porphyrins remaining after an initial hydrotreating step conducted in the absence of the halogen hydride. There exists no recognition of using hydrogen iodide and/or hydrogen bromide for the purpose of effecting hydrorefining/hydrocracking reactions, and, it naturally follows that there is no concern for conservation of these anhydrous halides.

The foregoing examples of the prior art disclosures in the area of halogen hydride conversion of blank oils clearly indicate nonrecognition of the problems associated with the use of HI and HBr, and obviously, therefore, have no appreciation of the solution thereto as herein set forth.

SUMMARY OF INVENTION

In view of the foregoing described embodiments, and the discussion of the current state of published knowledge, it is readily ascertained that the present invention is an improvement to be adapted to those processes designed to convert contaminated, heavy hydrocarbon charge stocks using hydrogen chloride, hydrogen bromide and/or hydrogen iodide. In the interest of brevity, the following dissertation will be limited to HBr hydrorefining/hydrocracking of such charge stocks.

The use of hydrogen bromide, in the absence of a solid catalytic composite, is generally accomplished by admixing the hydrocarbon charge stock with about 1,000 to 10,000 s.c.f./bbl. of hydrogen, and from 0.1% to about 30.0% by weight of HBr, the mixture passing into a suitable enclosed vessel maintained under pressure ranging from about 500 to about 4000 p.s.i.g. Prior to being introduced to the reaction zone, the mixture is heated to the desired temperature in the range of from about 300° F. to about 1500° F., the precise conditions being dependent upon the characteristics of the charge stock. In any event, under these conditions, and in the presence of anhydrous hydrogen bromide, sulfurous and nitrogenous compounds are converted into hydrogen sulfide, ammonia and hydrocarbons; at least a portion of the asphaltic fraction is converted into more valuable lower boiling hydrocarbon soluble product; and, the metallic complexes are at least in part converted to metal-free hydrocarbons.

The problems associated with such a process are numerous; principal among them is the loss of HBr as a result of forming ammonium bromide as a constituent of the conversion zone effluent. Since ammonium bromide exists as a solid at temperatures below its sublimation point, 1008° F. (542° C.), separation of the effluent to concentrate the sludge consisting principally of unreacted asphaltics and metallic complexes causes the ammonium bromide to become a constituent of the sludge. Some of the HBr is also lost as a result of the formation of metallic bromides which also form part of the sludge. The sublimation temperature of ammonium iodide is about 761° F. (404.9° C.), and that of ammonium chloride is about 640° F.

The conversion product effluent exists in mixed-phase, and contains hydrogen, hydrogen sulfide, normally gaseous hydrocarbons including methane, ethane and propane, ammonia, normally liquid gasoline boiling range hydrocarbons including pentane, hexane and hydrocarbons boiling up to about 400° F., middle-distillate hydrocarbons, gas oil boiling range hydrocarbons, and unreacted asphaltic hydrocarbonaceous material boiling above 1050° F. From this type of product effluent, it is generally intended to recover, or produce, one or more of the following product streams: (1) a 650° F.-plus hydrocarbon fraction suitable for use as fuel oil; (2) a 400° F.–650° F. middle-distillate fraction for use either as fuel oil, or as the charge stock to a hydrocracking unit designed for maximum LPG (liquefied petroleum gas) production; (3) a gasoline boiling range fraction which may or may not contain butanes and pentanes; (4) a butane-pentane concentrate for use as a motor fuel blending component, or as the charge stock to an isomerization unit; (5) a hydrogen-rich gaseous phase to be recycled to the conversion zone to supply a portion of the hydrogen consumed therein; (6) a fuel gas waste product comprising methane and ethane, and being substantially free from the more valuable heavier hydrocarbons; and, (7) a residuum fraction containing the unreacted asphalts, metals and metallic compounds, and bromine in the form of ammonium bromide.

Usually, the product effluent is cooled to a temperature of about 750° F., say by serving as a heat-exchange medium, and introduced, without substantial pressure reduction, into a hot separator. The overhead portion, containing the normally gaseous constituents, is generally condensed, to a temperature of about 60° F. to about 130° F., and passed into a cold separator. The remaining portion or bottoms fraction from the hot separator is then subjected to standard conventional separation techniques for the recovery of various desired liquid product fractions. Such techniques are well within the purview of one skilled in the art and, since they form no part of the present invention, will not be described in detail. Similarly, with respect to the cold separator, the condensed liquid phase is further separated as desired in conventional separating means. The present concept is primarily directed to the further treatment of the bottoms fraction from the hot separator.

Since the hot separator functions at substantially the same pressure imposed upon the conversion zone, allowing only for the normal pressure drop experienced in flow through the system, the bottoms from the hot separator is generally flashed at about 700° F. and at a pressure of about atmospheric to about 200 p.s.i.g. This separation serves to further concentrate the heavy components from the product effluent. A convenient scheme for separating out the metal-containing sludge is to introduce the hot flash zone bottoms fraction into a vacuum colmn (50 to 100 mm. of Hg absolute) in which the last remaining distillable hydrocarbons are recovered, and the residual sludge is removed.

The sludge is placed in a suitable vessel and heated to a temperature of about 1020° F. at which the ammonium bromide becomes volatilized. The vapors are passed into a conversion zone having disposed therein an oxygen-containing compound of boron. The boron compound is preferably employed as a supported reagent prepared by impregnating a suitable refractory material—i.e., a composite of alumina and silica—with an oxyacid of boron. Although crystals or boron oxide particles may be used, they are not as efficient due to their relatively low degree of porosity as compared to a refractory inorganic oxide which has been impregnated. As will be recognized by those having skill in the art, the use of fixed beds of a supported reagent permits the incorporation of a "swing-bed" system in which the "on-stream" bed is being converted to ammonium borate, while the "off-stream" vessel is subjected to "regeneration" by decomposition at elevated temperature to form ammonia.

At conditions of a temperature of from 40° F. to about 400° F., the ammonium bromide reacts with the oxygen-containing boron compound to form ammonium borate and hydrogen bromide. The pressure imposed upon this ammonium bromide conversion zone may range from atmospheric to 3000 p.s.i.g., elevated pressure being preferred from the standpoint of the ease with which the bromine-hydrogen bromide may be recycled to combine with fresh charge stock.

Although the foregoing is believed to be sufficient to enable those having expertise in the art of petroleum technology to practice my invention, the following example is present to further illustrate the incorporation of the present scheme into a process for converting black oils using a halogen hydride as the catalytic agent.

EXAMPLE

The integration of the present invention into a black oil conversion process will be described in connection with a commercially-scaled unit designed to process 10,000 bbl./day of a vacuum residuum having a gravity of 8.8 ° API @ 60° F., a 20.0% volumetric distillation temperature of 1055° F., and containing 3.0% by weight of sulfur, 4,300 p.p.m. (by weight) of nitrogen and 6.5% by weight of heptane-insoluble asphaltics. Analysis further indicates metal contamination of about 450 p.p.m., most of which constitutes nickel-containing porphyrins.

The charge stock, in an amount of about 147,000 lbs./hr. is admixed with 1,470 lbs./hr. of hydrogen bromide (computed on the basis of bromine), the mixture passing into an enclosed vessel maintained under an imposed hydrogen pressure of about 2,575 p.s.i.g. and at a temperature of about 850° F. Hydrogen is employed in an amount of about 32,000 lbs./hr., inclusive of about 4,000 lbs./hr. of make-up hydrogen added to compensate for the hydrogen consumed in the reaction zone.

The product effluent, at a temperature of about 875° F. is passed, following heat-exchange to lower the temperature to about 750° F., into a hot separator at a pressure of about 2550 p.s.i.g. A principally vaporous phase, in an amount of about 60.647 lbs./hr., is cooled to a temperature of about 90° F., and is passed into a cold separator for recovery of a hydrogen-rich stream to be recycled to the process. The liquid phase, in an amount of about 119,823 lbs./hr. is introduced into a hot flash zone at a temperature of about 735° F. and a pressure of about 100 p.s.i.g. Analysis indicates that about 90.0% by weight of the bromide originally present in the conversion zone as HBr, is contained in this liquid phase.

The hot flash zone serves to further separate the effluent into a principally vaporous phase containing additional distillable hydrocarbons in an amount of about 16,365 lbs./hr. and an asphaltic-containing liquid phase, in an amount of about 103,458 lbs./hr. This latter liquid phase is heated to a temperature of about 835° F., and is introduced into a vacuum column maintained under a subatmospheric pressure of about 50 mm. of Hg, absolute. A light and heavy gas oil fraction, 72,755 lbs./hr. is removed as an overhead stream, and the remainder, 30,723 lbs./hr. is recovered as a metal-containing asphaltic sludge, of which about 1,323 lbs./hr. is in the form of ammonium bromide.

The sludge is heated to a temperature of about 1020° F. (the sublimation temperature of ammonium bromide being 1008° F.), and subjected once again to flashing. The ammonium bromide vapors, about 1280 lbs./hr., are immediately passed into the bottom of an enclosed vessel containing a composite of alumina and silica (the silica being present in an amount of about 12.0% by weight) which has been impregnated with orthoboric acid in an amount of about 40% by weight, calculated as $B_2O_3$. Two such vessels are connected in parallel, and when the gaseous stream from the upper portion of a vessel indicates that substantially all the boron has been converted into ammonium borate, the first vessel is removed from the flow pattern and the second vessel placed on-stream. The gaseous stream, comprising bromine and hydrogen bromide is recycled to combine with the hydrogen recycle and the fresh hydrocarbon charge. A bromide balance, computed on a once-through basis, indicates recovery of about 1270 lbs./hr. of the bromine originally present as hydrogen bromide; this is about 86.4% by weight.

The foregoing specification and example illustrate the method by which the present invention is effected, and the benefits afforded when the same is integrated into a process for the conversion of hydrocarbonaceous black oils.

I claim as my invention:

1. In a process for hydrorefining black oils containing sulfurous and nitrogenous compounds, and metallic contaminants, in which process a halogen hydride of a halogen selected from the group consisting of iodine, chlorine, bromine and mixtures thereof is employed as the catalytic agent, and which forms ammonium halides contained within a separated metallic sludge, the improvement which comprises heating said sludge to a temperature above the sublimation temperature of said ammonium halides, passing the resulting ammonium halide vapors into a conversion zone containing an oxygen-containing boron compound and reacting said ammonium halides to form ammonium borate and halogen hydrides, and recycling said halogen hydrides to said hydrorefining process.

2. The improvement of claim 1 further characterized in that said halogen hydride is hydrogen bromide.

3. The improvement of claim 1 further characterized in that said halogen hydride is hydrogen iodide.

4. The improvement of claim 1 further characterized in that said halogen hydride is hydrogen chloride.

5. The improvement of claim 1 further characterized in that said oxygen-containing boron compound is composited with a refractory inorganic oxide carrier material.

References Cited

UNITED STATES PATENTS

| | | | |
|---|---|---|---|
| 2,729,590 | 1/1956 | Bishop et al. | 208—241 |
| 2,943,048 | 6/1960 | Rust et al. | 208—252 |
| 2,971,905 | 2/1961 | Bieber et al. | 208—252 |
| 3,165,462 | 1/1965 | Friedman et al. | 208—252 |

DELBERT E. GANTZ, *Primary Examiner.*

G. J. CRASANAKIS, *Assistant Examiner.*

U.S. Cl. X.R.

208—13, 241, 251, 254